United States Patent
Marshall et al.

(10) Patent No.: US 7,024,791 B2
(45) Date of Patent: Apr. 11, 2006

(54) TAPE MEASURE WITH LASER BEAM

(75) Inventors: James D. Marshall, Mallorytown (CA); Oleksiy P. Sergyeyenko, Brockville (CA); Colin M. Dyke, Ontario (CA); Corey MacTavish, Ottawa (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/755,435

(22) Filed: Jan. 12, 2004

(65) Prior Publication Data

US 2005/0150126 A1    Jul. 14, 2005

(51) Int. Cl.
  *G01B 3/10*   (2006.01)
(52) U.S. Cl. .................... 33/768; 33/DIG. 21
(58) Field of Classification Search .................. 33/227, 33/286, 760, 761, 768, DIG. 21, 486, 488
  See application file for complete search history.

(56) References Cited

U.S. PATENT DOCUMENTS

| 2,563,674 | A |   | 8/1951  | Coots |  |
|---|---|---|---|---|---|
| 2,804,538 | A |   | 8/1957  | Leone |  |
| 2,914,269 | A |   | 11/1959 | Freeman |  |
| 4,200,984 | A |   | 5/1980  | Fink |  |
| 4,227,314 | A |   | 10/1980 | Schliep |  |
| 4,429,462 | A |   | 2/1984  | Rutty |  |
| 4,462,160 | A |   | 7/1984  | Cohen et al. |  |
| 4,479,617 | A |   | 10/1984 | Edwards |  |
| 4,516,325 | A | * | 5/1985  | Cohen et al. | 33/760 |
| 4,527,334 | A |   | 7/1985  | Jones |  |
| 4,578,867 | A |   | 4/1986  | Czerwinski |  |
| 4,580,347 | A | * | 4/1986  | McKnight | 33/760 |
| 4,908,954 | A | * | 3/1990  | Johnson | 33/768 |
| 4,930,227 | A |   | 6/1990  | Ketchpel |  |
| 4,944,097 | A | * | 7/1990  | Kang | 33/760 |
| 4,972,601 | A |   | 11/1990 | Bickford |  |
| 5,063,686 | A |   | 11/1991 | Peloquin |  |
| 5,075,977 | A |   | 12/1991 | Rando |  |
| 5,113,596 | A |   | 5/1992  | Meyers |  |
| 5,182,863 | A |   | 2/1993  | Rando |  |
| 5,287,627 | A |   | 2/1994  | Rando |  |
| 5,390,426 | A |   | 2/1995  | Hull |  |
| 5,430,952 | A | * | 7/1995  | Betts | 33/760 |
| 5,481,810 | A |   | 1/1996  | Hastings et al. |  |
| 5,531,031 | A | * | 7/1996  | Green | 33/286 |
| 5,544,420 | A | * | 8/1996  | Choi | 33/760 |

(Continued)

FOREIGN PATENT DOCUMENTS

JP        11014349        1/1999

(Continued)

OTHER PUBLICATIONS

M. Passier, European Search Report, Jan. 25, 2005, The Hague.

(Continued)

*Primary Examiner*—G. Bradley Bennett
(74) *Attorney, Agent, or Firm*—Wesley W. Muller; John Yun; Bruce S. Shapiro

(57) ABSTRACT

A tape measure includes a housing, a rule blade coilable within the housing, and a light plane generator disposed on the housing. The light plane generator may include a laser source for emitting a laser beam and a line lens in the path of the laser beam for converting the laser beam into a laser plane. Preferably, the laser plane intersects both the rule blade and a workpiece. The light plane generator may be pivoted about a horizontal axis and/or a vertical axis.

21 Claims, 2 Drawing Sheets

U.S. PATENT DOCUMENTS

| | | | | |
|---|---|---|---|---|
| 5,588,216 | A * | 12/1996 | Rank et al. | 33/286 |
| 5,746,004 | A | 5/1998 | Wertheim | |
| 5,787,599 | A | 8/1998 | Clifton | |
| 5,791,581 | A | 8/1998 | Loeffler et al. | |
| 5,836,081 | A * | 11/1998 | Orosz, Jr. | 33/DIG. 21 |
| 5,839,200 | A * | 11/1998 | Decesare | 33/390 |
| 5,842,282 | A * | 12/1998 | Ting | 33/227 |
| 5,848,481 | A | 12/1998 | Parsons et al. | |
| 5,864,956 | A * | 2/1999 | Dong | 33/227 |
| 5,894,675 | A | 4/1999 | Cericola | |
| 5,930,904 | A * | 8/1999 | Mualem | 33/281 |
| 5,983,510 | A * | 11/1999 | Wu et al. | 33/227 |
| 6,030,091 | A | 2/2000 | Li | |
| 6,098,303 | A | 8/2000 | Vogel | |
| D433,344 | S | 11/2000 | Hsu | |
| 6,148,534 | A | 11/2000 | Li | |
| 6,158,139 | A * | 12/2000 | Bond | 33/768 |
| 6,163,969 | A * | 12/2000 | Jan et al. | 33/286 |
| 6,182,916 | B1 | 2/2001 | Lin | |
| 6,202,312 | B1 * | 3/2001 | Rando | 33/227 |
| 6,209,219 | B1 | 4/2001 | Wakefield et al. | |
| 6,223,446 | B1 | 5/2001 | Potter | |
| 6,226,886 | B1 | 5/2001 | Lamond | |
| 6,243,964 | B1 | 6/2001 | Murray | |
| 6,249,986 | B1 | 6/2001 | Murray | |
| 6,256,895 | B1 | 7/2001 | Akers | |
| 6,282,808 | B1 | 9/2001 | Murray | |
| 6,324,769 | B1 | 12/2001 | Murray | |
| 6,360,446 | B1 * | 3/2002 | Bijawat et al. | 33/286 |
| 6,367,161 | B1 | 4/2002 | Murray | |
| 6,382,547 | B1 | 5/2002 | Yang | |
| D462,912 | S | 9/2002 | Li | |
| 6,449,866 | B1 | 9/2002 | Murray | |
| D464,579 | S | 10/2002 | Martone | |
| 6,473,986 | B1 | 11/2002 | Sun | |
| 6,526,673 | B1 * | 3/2003 | Reed | 33/761 |
| 6,568,099 | B1 | 5/2003 | Bergeron | |
| 6,581,296 | B1 * | 6/2003 | Ponce | 33/760 |
| D476,913 | S | 7/2003 | Blackman et al. | |
| 6,598,310 | B1 | 7/2003 | Odachowski | |
| 6,643,947 | B1 | 11/2003 | Murray | |
| 6,662,463 | B1 | 12/2003 | Lee | |
| 6,804,899 | B1 | 10/2004 | Murray | |
| 6,807,747 | B1 | 10/2004 | Hsu | |
| 6,839,981 | B1 | 1/2005 | Rafter | |
| 6,854,197 | B1 | 2/2005 | Knight | |
| 6,860,031 | B1 | 3/2005 | Odachowski | |
| 6,874,245 | B1 | 4/2005 | Liu | |
| D504,628 | S | 5/2005 | Weeks et al. | |
| D504,835 | S | 5/2005 | Snider | |
| 6,907,676 | B1 | 6/2005 | Liao | |
| 6,959,500 | B1 | 11/2005 | Liao | |
| 2002/0129509 | A1 | 9/2002 | Evans, III | |
| 2003/0000099 | A1 | 1/2003 | Wang | |
| 2003/0233762 | A1 | 12/2003 | Blackman | |
| 2004/0083615 | A1 | 5/2004 | Cotner | |
| 2004/0118001 | A1 | 6/2004 | Turpin | |
| 2004/0172839 | A1 | 9/2004 | Zirk et al. | |
| 2004/0205972 | A2 * | 10/2004 | Wu | 33/286 |
| 2004/0221470 | A1 | 11/2004 | Lin | |
| 2004/0237326 | A1 | 12/2004 | Wang | |
| 2005/0028397 | A1 | 2/2005 | Blackman | |
| 2005/0034320 | A1 | 2/2005 | Conner | |
| 2005/0138829 | A1 | 6/2005 | Critelli | |
| 2005/0210696 | A1 | 9/2005 | Liao | |

FOREIGN PATENT DOCUMENTS

| | | |
|---|---|---|
| JP | 2000-298001 | 10/2000 |

OTHER PUBLICATIONS

Annex to the European Search Report on European Patent Application No. EP 05 00 0125.

Patent Abstracts of Japan, Publication No. 11014349, Publication Date Jan. 22, 1999, Applicant Kyokuto Kogyo KK.

* cited by examiner

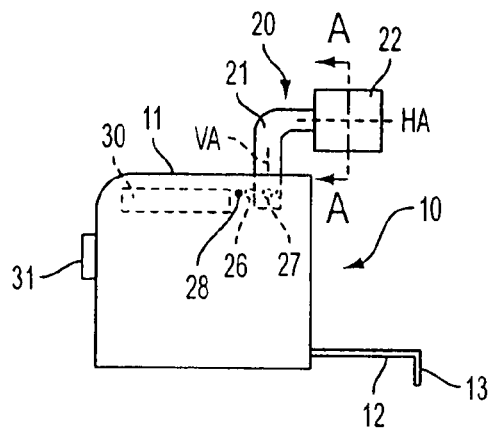
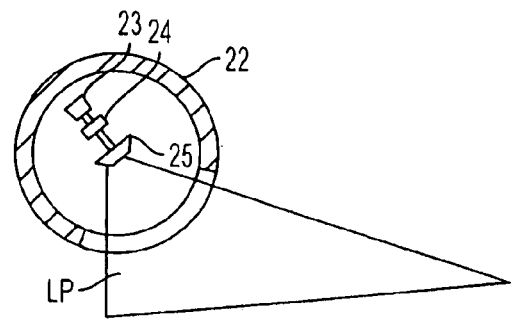
FIG. 1　　　　　　　FIG. 2
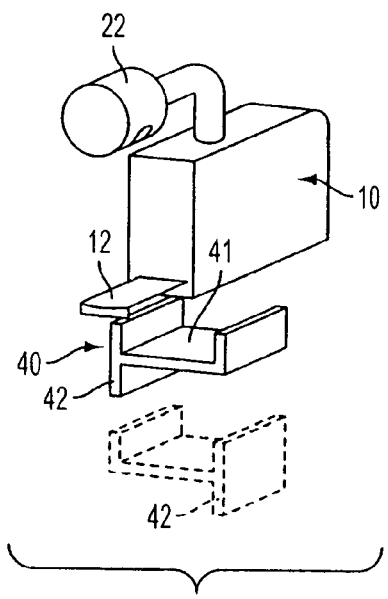
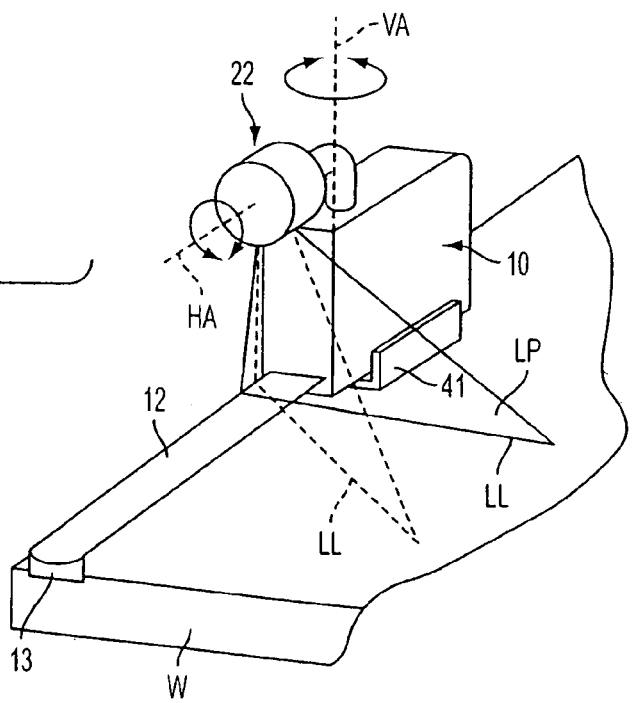
FIG. 3　　　　　　　FIG. 4

TAPE MEASURE WITH LASER BEAM

FIELD OF THE INVENTION

This invention relates generally to tape measures and more specifically to a tape measure in combination with a laser device.

BACKGROUND OF THE INVENTION

Tape measures are well known devices used to measure distances, and are helpful in marking distances. It is desired to provide a device that enables the user to measure and/or mark distances more accurately.

It is an object of the present invention to provide a laser level that is inexpensive and usable by the general public.

SUMMARY OF THE INVENTION

In accordance with the present invention, an improved tape measure is employed. The tape measure has a housing, a rule blade coilable within the housing, and a light plane generator disposed on the housing, the light plane generator including a laser source for emitting a laser beam and a line lens in the path of the laser beam for converting the laser beam into a laser plane. Preferably, the laser plane intersects both the rule blade and a workpiece. The light plane generator may be pivoted about a horizontal axis and/or a vertical axis.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a side view of a tape measure according to the invention;

FIG. 2 is a cross-sectional view along line A—A of FIG. 1;

FIG. 3 shows the tape measure used with a bracket;

FIG. 4 shows the tape measure on a workpiece;

FIG. 5 shows the tape measure with an alternative bracket, where

DETAILED DESCRIPTION

Figure 5A:
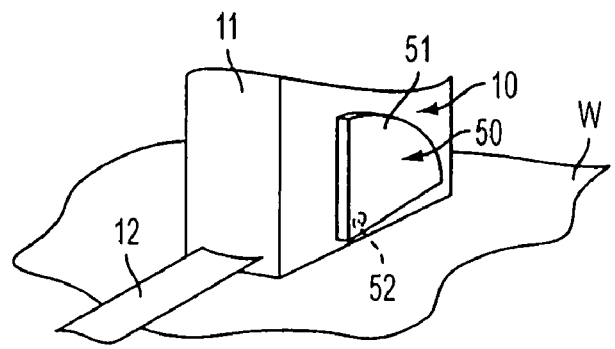
FIGS. 5A–5B illustrate the bracket in a first and second position, respectively.

The invention is now described with reference to the accompanying figures, wherein like numerals designate like parts. Referring to FIG. 1, a tape measure 10 may have a housing 11, an elongated flexible rule blade 12 (also known as a tape) which is carried on a controllable spring-biased reel assembly (not shown) disposed within housing 11, and a blade locking mechanism (not shown) actuated by a blade locking actuator (not shown) for locking the elongated blade 12 into a desired position to prevent the blade 12 from being further extended from the housing and from being wound into the housing by the spring-bias of the reel assembly. Persons skilled in the art will recognize that details of any of the parts referred to above, as well as further information on such tape measure, can be found in U.S. Pat. No. 6,209,219, which is hereby wholly incorporated herein by reference.

The tape measure 10 may also have a light plane generator 20. Referring to FIGS. 1–4, the light plane generator 20 preferably generates a plane of light LP so that, when tape measure 10 is placed on a workpiece W, the light plane LP contacts the workpiece W and/or the blade 12, creating a light line LL thereon. Preferably, the light plane generator 20 has a housing 22, a laser diode 23 disposed in the housing for generating a laser beam, a collimating lens 24 for collimating the laser beam, and a line lens 25 for converting the laser beam into a laser light plane LP. Line lens 25 may be a cylindrical lens.

This assembly is preferably pivotally connected to an L-shaped neck 21, which may be pivotally attached to housing 11. Accordingly, a user can adjust the light plane generator about a horizontal axis HA and/or a vertical axis VA.

Light plane generator 20 may also include a battery 30 for powering the laser diode 23. Battery 30 may be disposed in housing 11 or housing 22. Light plane generator 20 may also include a switch 31 for turning laser diode 23 on and off. Switch 31 may be housing 11 or housing 22.

It is preferable to provide a detent system for enabling the user to quickly locate the most common positions of the neck 21 (and thus light plane generator 20) relative to housing 11. Accordingly, neck 21 may have detent notches 27 that receive a ball 26, which is biased towards neck 21 by a spring 28. Persons skilled in the art will recognize that detent notches 27 and ball 26 may also be provided on housing 11 and neck 21, respectively.

It may be preferable to place tape measure 10 on a bracket 40. Bracket 40 may include a U-shaped body 41 for receiving tape measure 10 and a flange 42 extending downwardly. With such arrangement, the user can place flange 42 against an edge of workpiece W, thus mounting tape measure 10 at the periphery of the workpiece W. Persons skilled in the art will recognize that bracket 40 can be disposed on tape measure 10 in two positions: with the flange 42 on the left side (shown in solid lines in FIG. 3); and with the flange 42 on the right side (shown in broken lines in FIG. 3).

With such arrangement, the user can place the tape measure 10 on bracket 40, place both on workpiece W, pull blade 12 and hook the edge of workpiece W with tab 13. The user can then turn on the light plane generator 20 by moving switch 31. Light plane generator 20 then generates a light plane LP which creates a light line LL on workpiece W. The user can rotate housing 22 about the horizontal axis HA so that the light plane LP also lights blade 12. Accordingly, light line LL will show on both blade 12 and workpiece W. If desired, the user can rotate light plane generator 20 about vertical axis VA to change the angle of light line LL relative to blade 12, as shown in broken lines in FIG. 4.

Persons skilled in the art will recognize that, in the embodiment shown in FIG. 4, the light line LL extends rightwardly from blade 12. However, the user need only rotate housing 22 about the horizontal axis HA in order for light line LL to extend leftwardly from blade 12.

Figure 5B:
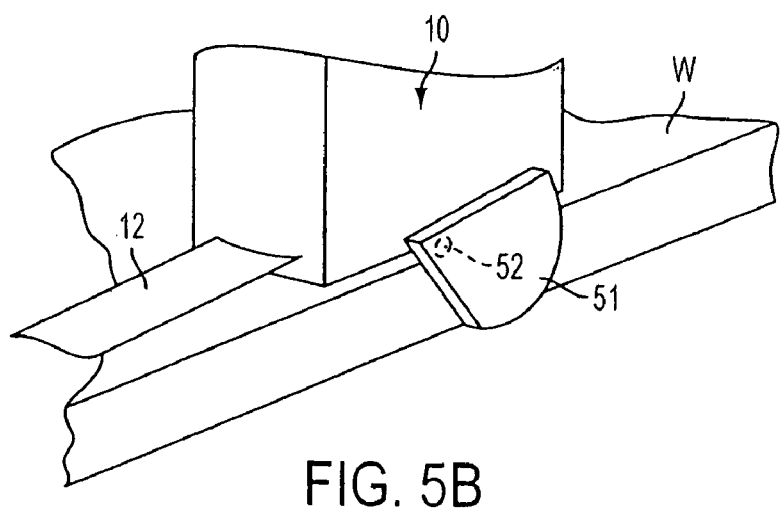

Persons skilled in the art will recognize that other brackets may be used with tape measure 10. Referring to FIG. 5, tape measure 10. Referring to FIG. 5, a bracket 50 may be disposed on tape measure 10. Bracket 50 may include a flange 51 which is pivotably attached to housing 11 via shaft 52. This would allow the user to rotate the flange 51 between a first position where the flange 51 does not contact workpiece W (shown in FIG. 5A) and a second position where the flange 51 contacts an edge of workpiece W (shown in FIG. 5B).

Figure 5C:
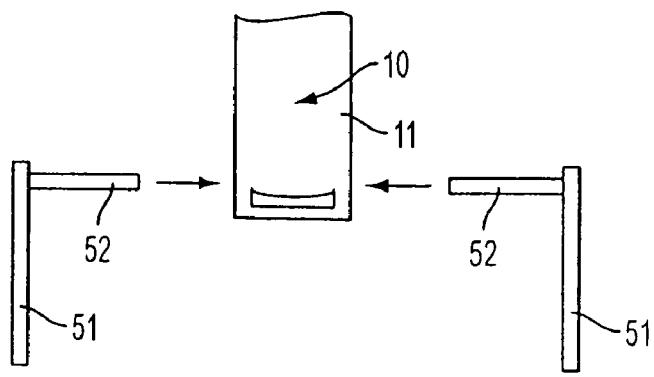
FIG. 5C shows different installation alternatives for such brackets.

As shown in FIG. 5C, bracket 50 may be separable from housing 11 and inserted on the other side thereof. This would allow the user to move the bracket 50 to contact a different edge of workpiece W, etc. Alternatively, housing 11 may carry two brackets 50 non-removably and rotatably attached to housing 11.

Persons skilled in the art may recognize other additions or alternatives to the means disclosed herein. However, all these additions and/or alterations are considered to be equivalents of the present invention.

The invention claimed is:

1. A tape measure disposable on a surface comprising:
   a housing;
   a rule blade coilable within the housing, the rule blade including indicia for making a measurement; and
   a light plane generator disposed on the housing, the light plane generator operable to emit a laser light plane to create a light line on at least one of the rule blade and the surface;
   wherein the light plane generator comprises a laser source for emitting a laser beam and a line lens for converting the laser beam into the laser light plane, and wherein the laser light plane is adapted to align with the indicia on the rule blade and at least one point on the surface.

2. The tape measure of claim 1, wherein the light plane generator is adapted to pivot about a horizontal axis.

3. The tape measure of claim 1, wherein the light plane generator is adapted to pivot about a vertical axis.

4. The tape measure of claim 1 further comprising a bracket configured to removably receive the housing, the bracket including a flange extending downwardly therefrom.

5. The tape measure of claim 1 further comprising a neck attached to the housing, the neck supporting the light plane generator.

6. The tape measure of claim 5, wherein the neck is pivotally attached to the housing.

7. The tape measure of claim 6, wherein the neck pivots relative to the housing about a vertical axis.

8. The tape measure of claim 6, wherein one of the neck and the housing has a detent notch, and the other of the neck and the housing has a detent biased towards the detent notch.

9. The tape measure of claim 5, wherein the light plane generator is pivotally attached to the neck.

10. The tape measure of claim 9, wherein the light plane generator pivots relative to the neck about a horizontal axis.

11. The tape measure of claim 9, wherein the light plane generator pivots relative to the housing about a horizontal axis.

12. A measuring device comprising:
   a housing;
   a rule blade adapted to extend from the housing, the rule blade including
     a blade surface extending between a first blade edge and a second blade edge, and
     indicia on the blade surface, the indicia configured for making a measurement; and
   a light generator operable to emit a light plane extending from a point located on the blade surface to a point located beyond at least one of the first blade edge and the second blade edge,
   wherein the light plane is configured to align the indicia on the blade surface with the point located beyond at least one of the first blade edge and the second blade edge.

13. The measuring device of claim 12, wherein the light plane is a laser light plane and the light generator comprises:
   a laser source configured to emit a laser beam; and
   a line lens operable to convert the laser beam into the laser light plane.

14. The measuring device of claim 12, wherein the rule blade is operable to extend over a work piece, and the light plane creates a light line that is projected onto both the work piece and the rule blade, creating a light line thereon.

15. The measuring device of claim 12, wherein the light generator is configured to rotate with respect to the housing to change the angle of the light plane relative to the rule blade.

16. The measuring device of claim 12, wherein the light generator is operable to rotate from a first position, in which the light plane extends from the rule blade to a point beyond the first blade edge, to a second position, in which the light plane extends from the rule blade to a point beyond the second blade edge.

17. The measuring device of claim 12, wherein the light generator is pivotally coupled to the housing.

18. The measuring device of claim 12, wherein the light plane extends from a point on the blade surface to points located beyond both the first blade edge and the second blade edge.

19. The measuring device of claim 12 further comprising a bracket operable to pivot from a first, stowed position to a second, extended position for contacting a work piece.

20. The measuring device of claim 12 further comprising a bracket coupled to the measuring device, the bracket including a tab configured to engage an edge of a workpiece.

21. A measuring device comprising:
   a housing;
   a rule blade operable to extend from the housing, the blade including a blade surface extending between a first blade edge and a second blade edge; and
   a laser light plane generator operable to selectively emit a light line onto at least one of an area located on the blade surface, an area located beyond the first blade edge, and an area beyond the second blade edge;
   wherein the rule blade surface includes indicia for making a measurement and the light line is configured to align the indicia with at least one point located beyond one or more of the blade edges.

* * * * *